March 22, 1927. 1,621,614
J. WALLACE
VEHICLE RIM
Filed June 5, 1925
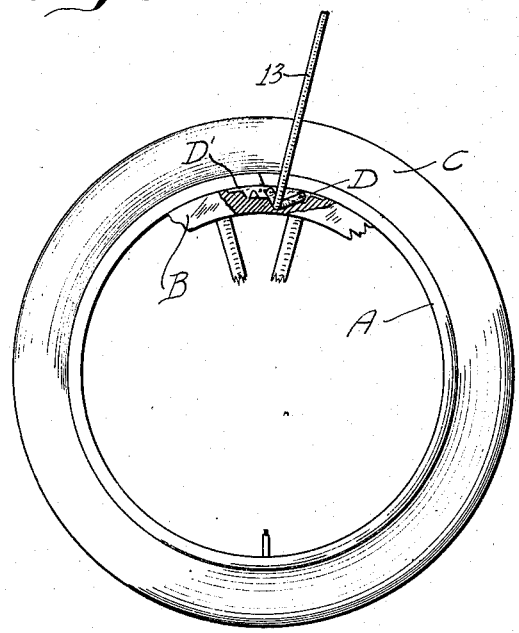
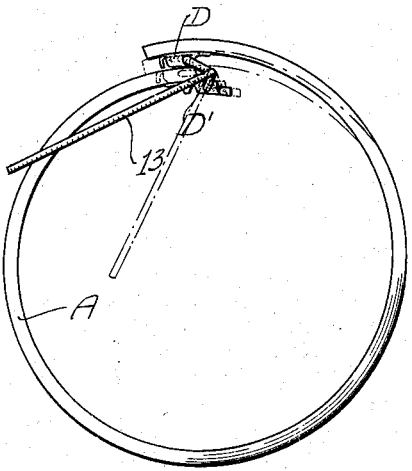
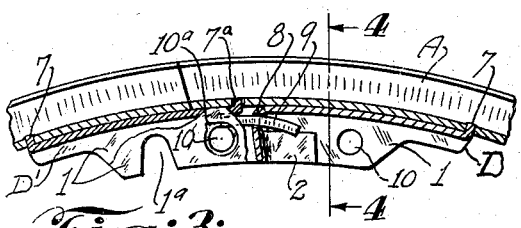
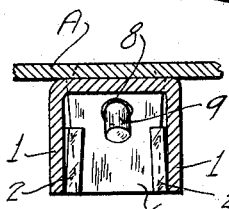
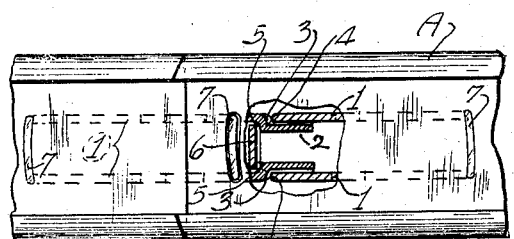
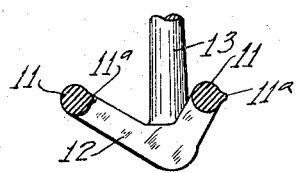
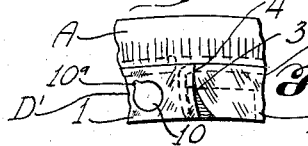
INVENTOR
James Wallace.
By Bakewell & Church
ATTORNEYS Patented Mar. 22, 1927.

1,621,614

UNITED STATES PATENT OFFICE.

JAMES WALLACE, OF AFFTON, MISSOURI.

VEHICLE RIM.

Application filed June 5, 1925. Serial No. 35,091.

This invention relates to demountable rims of the kind that are used on vehicle wheels for carrying pneumatic tires, and particularly demountable rims of the type commonly referred to as one-piece, transversely split rims.

A rim of the type referred to consists of a substantially ring-shaped member or annular member divided or cut transversely at one point so as to permit the end portions of said member at opposite sides of said transverse joint to be arranged in overlapping relation, thereby partially collapsing the rim or reducing the diameter of same sufficiently to permit it to be withdrawn from the tire which it carries or sustains on the wheel. Various devices have heretofore been devised for partially collapsing tire rims of the general type above referred to, but the devices that have been put on the market have not proved entirely satisfactory, principally because they were of such complicated design that the average tire user could not apply them properly to a rim, and also because of their tendency to spring out of engagement with the rim or twist in such a way as to permit one end portion of the rim to move laterally with relation to the other end portion of the rim when the rim is collapsed.

The main object of my invention is to provide a one-piece, transversely-split tire rim that is equipped with interlocked members which securely hold the end portions of the rim in proper relation when the rim is in use and which are constructed so that a rim tool of simple design can be engaged with said members and thereafter actuated to move the end portions of the rim into overlapping relation, said members and tool being so constructed that there is no possibility of the tool springing out of engagement with said members and no possibility of one end portion of the rim moving laterally with relation to the other end portion.

Another object is to provide a one-piece, transversely split tire rim in which the members on the end portions of the rim that hold said end portions in alignment, are of such design that when they move into engagement with each other during the operation of expanding the rim or restoring it to its normal condition, they will exert endwise pressure on each other in a direction to insure the ends of the rim moving into proper abutting relation.

Figure 1 of the drawings is a side elevational view of a demountable tire rim constructed in accordance with my invention, showing a portion of the felloe of the wheel on which the rim is mounted.

Figure 2 is a side elevational view of said rim, showing it collapsed and with the tire removed from the rim.

Figure 3 is an enlarged sectional view, showing the end portions of the rim arranged in proper abutting relation and with one of the co-operating interlocked members on said end portions partly broken away so as to more clearly illustrate the construction of same.

Figure 4 is a transverse sectional view, taken on the line 4—4 of Figure 3, looking in the direction indicated by the arrows.

Figure 5 is an outer plan view of the parts shown in Figure 3, partly broken away.

Figure 6 is a side elevational view of the tool that is used to collapse and expand the rim.

Figure 7 is a sectional view of said tool, taken on the line 7—7 of Figure 6, looking in the direction indicated by the arrows; and Figure 8 is a detail side elevational view of portions of the members on the end portions of the rim.

Referring to the drawings which illustrate the preferred form of my invention, A designates a one-piece, transversely-split tire rim that is adapted to be mounted on the felloe B of a wheel so as to serve as a supporting and holding means for a pneumatic tire C. Said rim is removably mounted on the felloe of the wheel and can be retained in operative position on the felloe by any suitable means. The rim A is provided with two co-operating members D and D' that are connected to the inner side of the end portions of said rim at opposite sides of the transverse split or joint in the rim. The members D and D' are provided with parts that co-operate with each other to prevent the end portions of the rim from moving transversely relatively to each other and from pulling apart or moving circumferentially relatively to each other when the rim is in use. Said members D and D' are also constructed so as to co-operate with a rim tool that is used to collapse and expand the rim A.

In the preferred form of my invention, as herein illustrated, the members D and D' are substantially channel-shaped in transverse cross section and are connected to the inner side of the end portions of the rim A in such a manner that the side flanges 1 of said members project inwardly from the rim, as shown in Figure 4. The side flanges 1 on one end portion of the member D' are constructed so that they will serve as a reduced extension on the member D' that fits snugly between the side flanges 1 of the member D when the rim is expanded, and thus prevents the end portions of the rim A from moving laterally with relation to each other. In the drawings I have used the reference character 2 to designate this reduced extension on the member D', and as shown in Figures 3 and 5, the member D' is mounted on the rim in such a way that the reduced extension 2 of same projects forwardly beyond the end portion of the rim to which the member D' is connected. The particular point at which the member D' is located on the end portion of the rim which carries it is immaterial, so long as said member is so positioned that the reduced extension 2 on the end of same will lap over the member D and project beyond the transverse split or joint in the rim A. Preferably, the reduced extension 2 on the member D' is made slightly tapered in transverse cross section, so that it will wedge tightly against the side flanges 1 of the member D, and thus take up any lost motion or side play between the members D and D' when said members are interlocked. By constructing the end portion of the member D' in the manner above described I obtain external shoulders 3 on the member D' that co-operate with the ends 4 of the side flanges 1 of the member D to exert endwise pressure on the members D and D' in a direction tending to expand the rim during the operation of moving said members into interlocking relation. I also obtain internal shoulders 5 on the member D', as shown in Figure 5, that co-operate with an inwardly-projecting prong 6 on the member D to prevent the members D and D' from separating or pulling apart circumferentially when said members are interlocked. The prong 6 just referred to is produced by removing the side flanges 1 at the outer end of the member D and bending the remaining portion of the web of said member from which the side flanges were removed inwardly at substantially right angles to the portion of the web of said member that is attached to the rim A.

From the foregoing it will be seen that in my improved rim the reduced extension 2 on the member D' co-operates with the side flanges 1 of the member D to hold the two end portions of the rim in longitudinal alignment, the inwardly-projecting prong 6 on the member D co-operates with the internal shoulders 5 of the member D' to prevent the end portions of the rim from separating or moving circumferentially relatively to each other in one direction and the ends of the side flanges 1 of the member D co-operate with the external shoulders 3 on the member D' to guide said members D and D' into interlocking relation during the operation of expanding the rim, thereby insuring the terminal ends of the rim moving into proper abutting relationship with each other. The members D and D' can be constructed in various ways, so long as they are provided with parts that move into interlocking relation when the rim is expanded, but in practice I prefer to form said members in the manner above described and construct them from relatively heavy sheet metal stampings that are adapted to be riveted or connected in any other suitable way to the end portions of the rim A. In the form of my invention herein illustrated each of said members is provided with an integral lug 7 that is adapted to be inserted in a hole in the rim A and then upset so as to secure the member of which said lug forms a part. The member D' is also provided with a lug 7ª that projects through a slot in the end portion of the rim to which the member D is attached. If desired, the inwardly-projecting prong 6 on the member D can be provided with a hole 8 in which a pin 9 can be inserted after said prong has moved into engagement with the internal shoulders 5 of the member D', so as to eliminate the possibility of the members D and D' accidentally pulling apart. In view of the fact that the members D and D' project inwardly from the rim, it is necessary to form a groove or pocket in the felloe of the wheel to receive said members, the particular design and construction of said pocket or groove being immaterial. If desired, the side flanges 1 of the members D and D' can be provided with one or more open-ended slots 1ª arranged so as to receive a cross bolt (not shown) in the felloe of the wheel that forms part of the means for retaining the rim in operative position on the felloe, said cross bolt serving to prevent the rim A from moving circumferentially of the felloe.

The side flanges 1 of the members D and D' are provided with holes 10 that are adapted to receive pins 11 which project laterally from one side of the head piece 12 of the rim tool. Said head piece is substantially elbow-shaped in general outline, and it is provided with an operating handle 13 by which the tool is manipulated after the pins 11 on the head piece of same have been introduced into the holes 10 in the side flanges of the members D and D'. To collapse the rim it is necessary to first remove the rim from the felloe of the wheels, then insert the pins 11 of the rim tool in the holes 10 provided for same in the members D and D', and thereafter rock the handle 13 of said tool in a direction to move the end portion of the rim that carries the member D into overlapping relation with the end portion of the rim that carries the member D', as shown in Figure 2. This operation collapses the rim or contracts it sufficiently to permit the tire C to be removed from same, and when it is desired to remount the tire, it is only necessary to rock the handle 13 of the rim tool in the opposite direction, which operation causes the side flanges 1 of the member D to move downwardly and wedge tightly against the reduced extension 2 of the member D', and also causes the prong 6 and the ends of the flanges 1 of the member D to move into engagement with the internal shoulders 5 and external shoulders 3, respectively, of the member D'. In order to eliminate the possibility of the rim tool becoming accidentally disengaged from the members D and D', I prefer to provide the pins 11 of said tool with laterally-projecting lugs 11$^a$ and provide one of the sets of holes 10 in the members D and D' with laterally-projecting extensions or notches 10$^a$, as shown in Figure 8, so as to cause the rim tool to be interlocked with the members D and D' by inserting the pins of the rim tool in the holes 10 with the lugs 11$^a$ on said pins positioned in the notches 10$^a$, then pushing the head of the tool inwardly far enough to cause said lugs to pass clear through said notches, and thereafter turning the head of the tool slightly so as to carry the lugs 11$^a$ on the pins 11 out of alignment with the notches 10$^a$ of the holes 10, thereby preventing the pins 11 from moving accidentally outwardly through the holes 10 in the members D and D'. The head piece 12 of the tool can be shaped in various ways without departing from the spirit of my invention, but I prefer to make said head piece substantially elbow-shaped, as herein illustrated, and connect it to the handle 13 of the tool by a shank 13$^a$ projecting laterally from the head piece and disposed at substantially right angles to the handle of the tool, said shank being long enough so as to prevent the handle of the tool from rubbing against the tire, in the operation of collapsing or expanding the rim A.

Having thus described my invention, what I claim as new and desire to secure by Letters Patent is:

1. A one-piece, transversely-split tire rim equipped with a substantially channel-shaped member projecting inwardly from one end portion of said rim and provided with a reduced extension and internal and external shoulders, a member projecting inwardly from the other end portion of the rim and provided with side flanges that co-operate with said extension and said external shoulders and provided with a prong that co-operates with said internal shoulders, and holes in said members arranged to receive a pair of transversely-disposed pins on a rim tool that is used to move the end portions of said rim into and out of overlapping relationship.

2. A one-piece, transversely-split tire rim provided at its end portions with a pair of inwardly-projecting members, a prong on one of said members that is adapted to co-operate with shoulders on the other members to prevent said members from pulling apart, a removable locking device arranged in said prong, and transversely-disposed holes in said members that are adapted to receive parts on a rim tool that are so arranged that a rocking movement of the tool in one direction moves the end portions of the rim into overlapping relation and a rocking movement of the tool in the opposite direction moves the terminal ends of said rim into abutting relationship.

3. A one-piece transversely-split tire rim provided at its ends with a pair of inwardly-projecting members of substantially channel shape in cross section, each of which has holes in its side flanges that are adapted to receive a pair of transversely-disposed pins on a tool that is used to expand and contract the rim, notches in one side of each of said members at the edges of one set of holes in same through which laterally-projecting lugs on the pins of the rim tool are adapted to be passed during the operation of arranging the tool in engagement with said members, a reduced, tapered extension on one of said members that is adapted to wedge between the side flanges of the other member, a hook on one of said members, and internal shoulders on the other member adapted to be engaged by said hook so as to prevent the ends of the rim from pulling apart.

JAMES WALLACE.